(12) United States Patent
Alford et al.

(10) Patent No.: US 7,092,948 B1
(45) Date of Patent: Aug. 15, 2006

(54) METHOD AND SYSTEM OF INTEGRATING INFORMATION FROM MULTIPLE SOURCES

(75) Inventors: Francine A. Alford, Livermore, CA (US); David L. Brinkerhoff, Antioch, CA (US)

(73) Assignee: The Regents of the University of California, Oakland, CA (US)

( * ) Notice: Subject to any disclaimer, the term of this patent is extended or adjusted under 35 U.S.C. 154(b) by 1034 days.

(21) Appl. No.: 09/656,484

(22) Filed: Sep. 7, 2000

Related U.S. Application Data (60) Provisional application No. 60/153,099, filed on Sep. 9, 1999.

(51) Int. Cl.
G06F 17/30 (2006.01)
G06F 7/00 (2006.01)

(52) U.S. Cl. ...................................... 707/100
(58) Field of Classification Search .................. 707/10, 707/1, 100, 200, 102; 712/1
See application file for complete search history.

(56) References Cited

U.S. PATENT DOCUMENTS

| | | | |
|---|---|---|---|
| 5,089,970 A | 2/1992 | Lee et al. .................... 364/468 |
| 5,101,352 A | 3/1992 | Rembert et al. ............ 364/401 |
| 5,311,438 A | 5/1994 | Sellers et al. ............... 364/468 |
| 5,355,320 A | 10/1994 | Erjavic et al. .............. 364/488 |
| 5,625,816 A | 4/1997 | Burdick et al. ............. 395/614 |
| 5,768,510 A | 6/1998 | Gish ..................... 395/200.33 |
| 5,799,284 A | 8/1998 | Bourquin ..................... 705/26 |
| 5,848,246 A | 12/1998 | Gish ..................... 395/200.58 |
| 5,864,843 A | 1/1999 | Carino et al. .................. 707/4 |
| 5,867,646 A | 2/1999 | Benson et al. .............. 395/186 |
| 5,872,970 A | 2/1999 | Pickett et al. ............... 395/671 |
| 5,899,990 A | 5/1999 | Maritzen et al. ............... 707/4 |
| 5,928,335 A | 7/1999 | Morita ....................... 709/303 |
| 5,943,496 A | 8/1999 | Li et al. ..................... 395/685 |
| 5,953,707 A | 9/1999 | Huang et al. ................. 705/10 |
| 5,963,924 A | 10/1999 | Williams et al. ............. 705/40 |
| 5,970,472 A | 10/1999 | Allsop et al. ................. 705/26 |
| 5,978,594 A | 11/1999 | Bonnell et al. ............. 395/837 |
| 5,987,245 A | 11/1999 | Gish .......................... 395/680 |
| 5,987,497 A | 11/1999 | Allgeier ..................... 709/201 |
| 6,006,195 A | 12/1999 | Marchak ........................ 705/9 |
| 6,006,230 A | 12/1999 | Ludwig ....................... 707/10 |
| 6,014,700 A | 1/2000 | Bainbridge ................. 709/226 |
| 6,038,590 A | 3/2000 | Gish .......................... 709/203 |
| 6,052,711 A | 4/2000 | Gish .......................... 709/203 |
| 6,058,426 A | 5/2000 | Godwin et al. ............. 709/229 |
| 6,078,914 A | 6/2000 | Redfern ......................... 707/3 |
| 6,094,679 A | 7/2000 | Teng et al. ................. 709/220 |

OTHER PUBLICATIONS

Oracle® Applications, Concepts, Release 11 for Unix, Apr. 1998, Oracle Corporation.*
Oracle® Applications, System Administrator's Guide, Release 11 for Unix, Mar. 1998, Oracle Corporation.*

(Continued)

*Primary Examiner*—Greta Robinson
*Assistant Examiner*—Kuen S. Lu
(74) *Attorney, Agent, or Firm*—Eddie E. Scott; Alan H. Thompson; L. E. Carnahan (57) ABSTRACT

A system and method of integrating information from multiple sources in a document centric application system. A plurality of application systems are connected through an object request broker to a central repository. The information may then be posted on a webpage. An example of an implementation of the method and system is an online procurement system.

22 Claims, 5 Drawing Sheets

OTHER PUBLICATIONS

Using Meta Data to Automate XML Document Production and Maintenance, May 1998.*
Oracle® Purchasing User's Guide, Release 11 for Unix, Mar. 1998, Oracle Corporation.*
Oracle® Applications, Concepts, Release 11i, May 2000, Oracle Corporation.*
Oracle® US Federal HRMS—The Fundamentals, Release 11i, Jan. 2000, Oracle®.*
Oracle® Engineering User Guide, Release 11i, Jan. 2000, Oracle®.*
Oracle® Purchasing User's Guide, Release 11i, Jan. 2000, Oracle®.*
Oracle® Master Scheduling/MRP and Supply Chain Planning Guide, Release 11i, Jan. 2000, Oracle®.*
Using Oracle® HRMS—The Fundamentals [US], Release 11i, Jan. 2000, Oracle ®.*
Open Text Corporation List of Press Releases for 1999 (http://www.opentext.com/news/search_results.asp?year=1999).
Press release, Open Text Introduces Livelink Catalogued Library, Jun. 7, 1999.
Press release, Open Text Introduces Livelink 8.1, Apr. 15, 1999.
Press release, Lockheed Martin Chooses Livelink to Create Global Extranet, Feb. 17, 1999.
Open Text Corporation Product Information from web (http://www.opentext.com/product), Copyright 2000.

* cited by examiner

METHOD AND SYSTEM OF INTEGRATING INFORMATION FROM MULTIPLE SOURCES

Applicants claim priority to U.S. Provisional Application 60/153,099 filed on Sep. 9, 1999 and assigned to The Regents of the University of California.

The United States Government has rights in this invention pursuant to Contract No. W-7405-ENG-48 between the United States Department of Energy and the University of California for the operation of Lawrence Livermore National Laboratory.

FIELD OF THE INVENTION

The invention relates generally to information systems and, more specifically, the invention relates to a system and method for integrating information from multiple source locations.

BACKGROUND OF THE INVENTION

The data processing resources of large organizations are increasingly taking the form of a client/server or distributed computing environment (DBE) in which data and processing are dispersed over a network comprising many heterogeneous and geographically remote servers and databases. Many of these servers and databases are programmed in a different variety of computing languages and cannot communicate properly.

SUMMARY OF THE INVENTION

Aspects of the invention include a system comprising a first application system containing a first set of data; a second application system containing a second set of data; a first server coupled to the first and second application system; a central repository coupled to the server and capable of integrating the first and second sets of data to form a central repository set of data; and wherein the first and second databases are programmed in a first format and the central repository is programmed in a second format.

Aspects of the invention include a method comprising: creating a first set of data in a first application system; creating a second set of data in a second application system; passing said first and second sets of data to a first server which is configured to run an object broker; passing said first and second sets of data from said first server to a central repository; and integrating said first and second sets of data in the central repository database to form a central repository set of data.

BRIEF DESCRIPTION OF THE DRAWINGS

The accompanying drawings, which are incorporated into and form a part of the disclosure.

DETAILED DESCRIPTION OF THE INVENTION

The following description will focus on embodiments which operate in a network environment executing document centric-application systems. The disclosed embodiments are not limited to any particular application or environment. Instead, those skilled in the art will find that the disclosed embodiments may be used advantageously applied to any application or environment where integration of disparate sources of document data is desirable. The description of the exemplary embodiments which follows is, therefore, for the purpose of illustration and not limitation.

Figure 1:
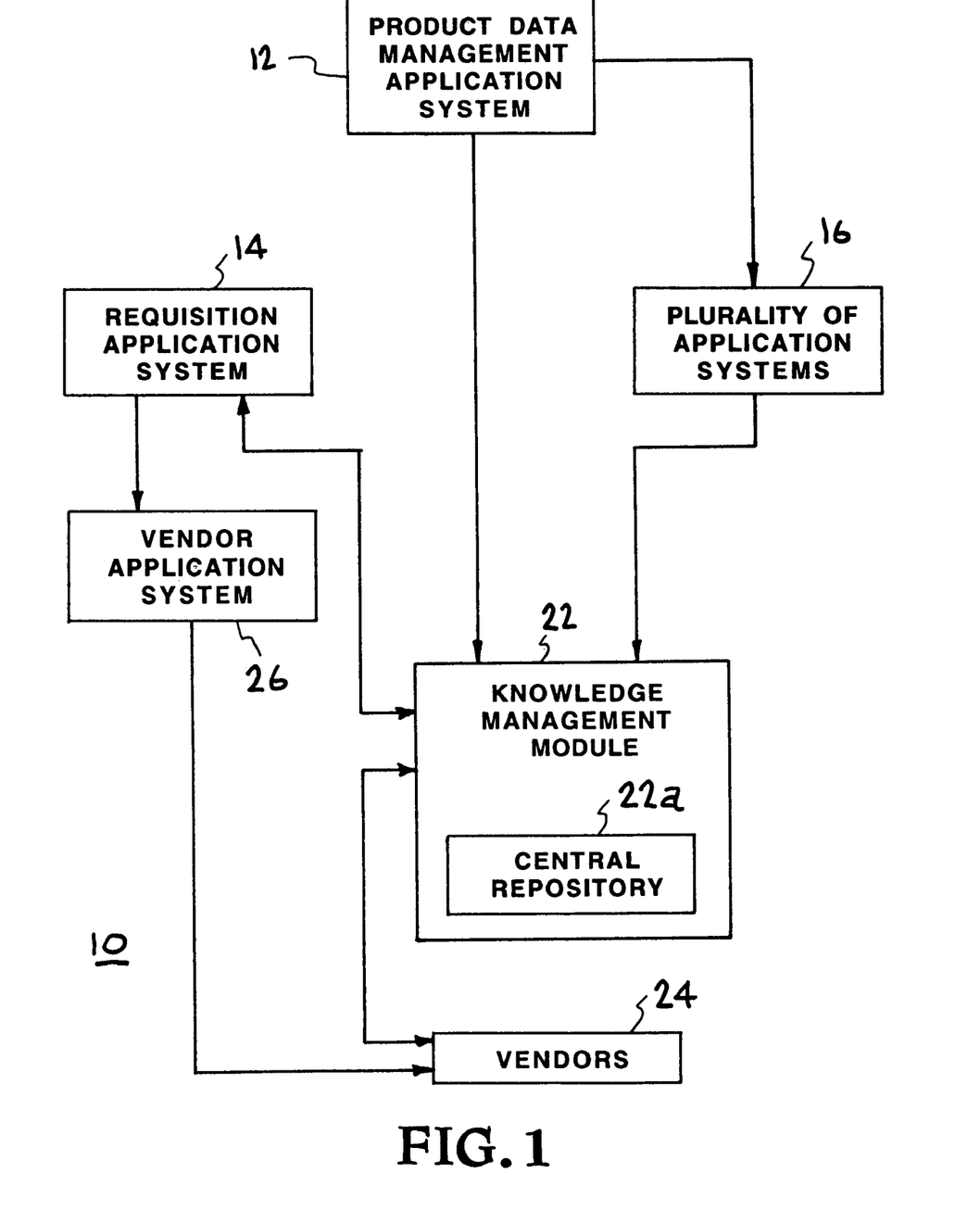
FIG. 1 is a schematic representation in block diagram form of information flow within a procurement system using a World Wide Web based system.

FIG. 1 is a schematic representation in block diagram form of information flow within a procurement system 10 using communication protocols based on the World Wide Web (i.e., a Web-based system). FIG. 1 is an example of how the document centric-application system 100 of FIG. 2 may be used to integrate information from multiple sources within the procurement system 10. A job may be designed or the specifications created in a product data management module 12. A job may be a product, system or service. The job specifications may be a high order of complexity and contain information in the form of text and graphics (e.g., drawings). The job specifications may then be forwarded through a network (either local or global) to a knowledge management module 22 containing a central repository database 22a. The knowledge management module 22 may then forward the job specifications to a requisition application system 14 where an initial online requisition system (OLR) order (or job order) may be manually (or automatically) created by an operator (e.g., procurement agent) at a user interface to the procurement system and sent back to the knowledge management module 22. A job order will be created in the central database 22a of the knowledge management module 22.

Simultaneously to forwarding the job specifications to the knowledge management module 22, requests for job specifications and other document attachments may be forwarded from product data management application system 12 throughout the network to a variety of different application systems (or data storage modules) 16 (e.g., engineering records center, vendor authorization center, etc.) to collect further procurement information such as drawings, etc. The job order from the requisition application system 14 and information from application systems 12 and 16 will be integrated in the knowledge management module 22 and stored in a job order record or folder in the central repository 22a. The knowledge management module 22 is also configured to display the job order on a website so that it may be accessed through the network or externally over the Internet. Approved vendors 24 may access the central repository 22a through the website to obtain the job order and, in return, place a quote or bid. The knowledge management module 22 may be configured to gather bids by vendors and forward them to the requisition application system 14. After a vendor is awarded the job, the vendor authorization application system 26 may be notified and a purchase order sent to a designated vendor. The procurement system 10 may be designed to allow the continuous updating of the central repository 22a by the application systems 12, 14, 16 and 26 as the bid process progresses in an efficient manner. Also, since the application systems 12, 14, 16 and 26 may run separately from the knowledge management module 22, in the event the knowledge management module 22 is disabled, the application systems 12, 14, 16 and 26 are still capable of functioning independently.

Figure 2:
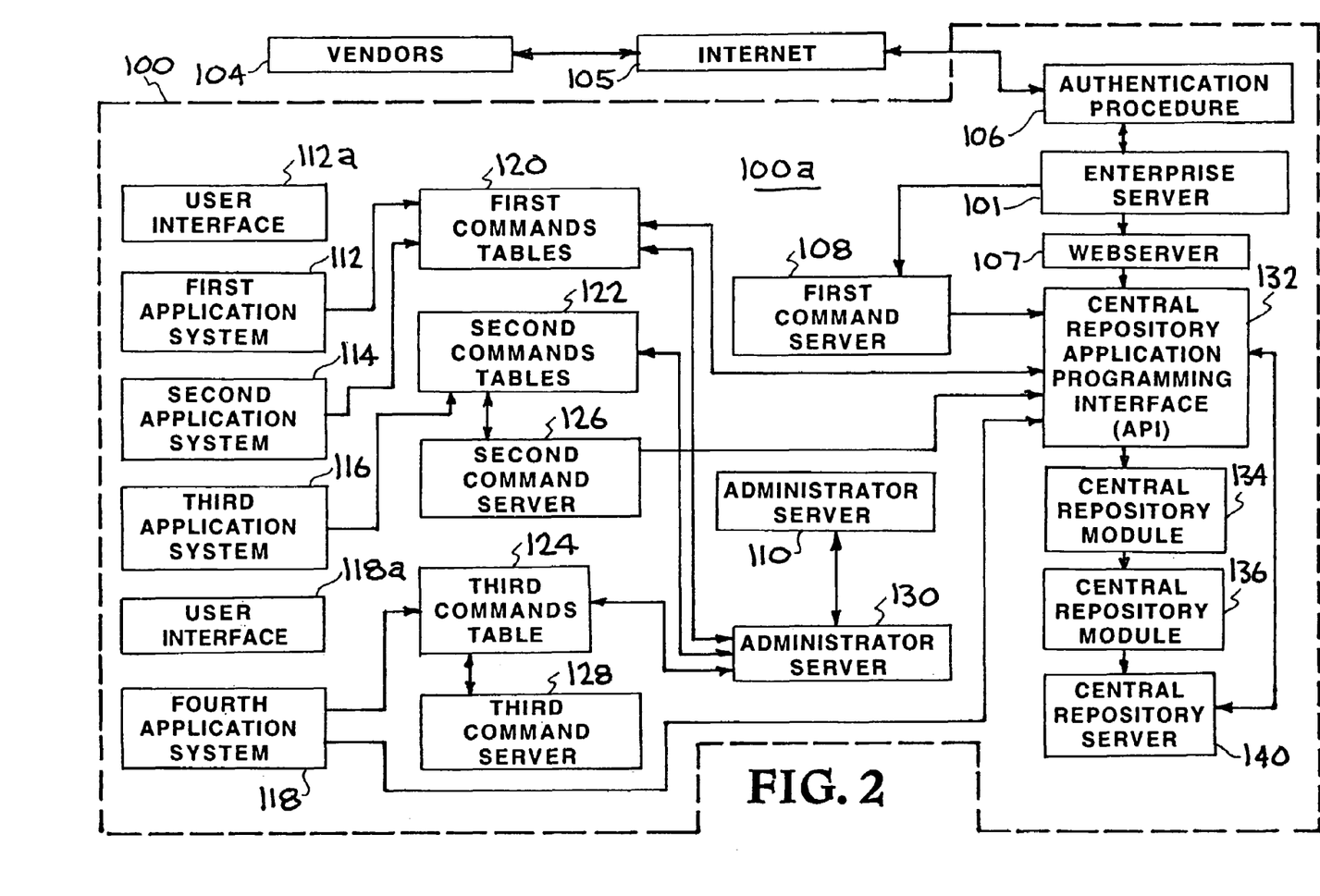
FIG. 2 is a schematic representation of the procurement system of FIG. 1.

FIG. 2 illustrates the relationship between a plurality of elements in a document centric-application system 100. The servers and clients of the document centric-application system 100 are connected via an enterprise communication network 100a. The enterprise communication network 100a may be a global communications network with system elements located throughout the world or, alternatively, a local area network (LAN), such as a token-ring network or an Ethernet network. An enterprise server 101 may be configured to operate the enterprise communication network 100a. Vendors 104 may access the enterprise server 101 through the Internet 105. An authentication procedure 106 prevents unauthorized access to the enterprise communications network 100a and webserver 107. Webserver 107 stores the programming codes necessary to create a webpage to which the vendors 104 may access to obtain integrated job order information. The webserver 107 will obtain integrated job order information content from a central repository 140 through a central repository application programming interface (API) 132 which will be discussed below.

First, second, third and fourth application systems (each with an accompanying database and database server) 112, 114, 116, and 118 contain information which is required by the knowledge management program which is stored on a server associated with the central repository database 140. Throughout the disclosure, the term server will be used to indicate hardware, software code or a combination which provide a response to requests for services from other components or applications. The databases of the application systems 112, 114, 116 and 118 may be implemented using standard System Query Language (SQL)-type relational databases such as those provided by Oracle Corporation. The information (e.g., computer files) in the application systems 112, 114, 116, and 118 will take the form of text, graphic data (e.g., from a CAD/CAM system), or scanned images. The knowledge management program may be a collaborative environment software product such as Livelink® from Open Text Corporation. For the purposes of this discussion, the knowledge management program will also be known as the central repository database management software. The central repository database management software will be configured to integrate the information provided by the system and method of the disclosed embodiments from the first, second, third and fourth application systems 112, 114, 116 and 118 and supply it to vendors 104. Although four application systems 112, 114, 116 and 118 are being shown in FIG. 1 for example purposes, it is to be understood that the system described herein is scaleable and the number of application systems might be greater (or lesser) depending on the number of disparate sources that are required to be integrated.

User interface 118a will allow job specifications to be entered into a product data management application system 118. These job specifications may be forwarded from the product data management application system 118 through the communications network 110a (and optionally through the central repository 140) to a first application system 112. First application system 112 may be a requisition application system. A procurement agent may manually (or automatically) enter the forwarded job specifications into an online order entry system located in first application system 112 to create a job order. The online order entry system or requisition application system 112 may be a web-based application and is therefore Transmission Control Protocol/Internet Protocol (TCP/IP) compliant. The first application system 112 is designed to store the job order and any job specification updates and to provide this information to central repository server 140.

Second, third and fourth application systems 114, 116 and 118 are configured to provide a wide variety of procurement information to central repository 140. For example, second application system 114 may be a procurement system that will provide information such as eligible vendors, predetermined vendor information, and purchase order information to central repository server 140. Third application system 116 may be an engineering records system that will provide drawings and other information to the central repository server 140. Fourth application system 118 may run a product data management software program that provides job specifications.

First, second and third command servers 108, 126 and 128 are shown in the schematic of FIG. 2 as being located functionally between the application systems 112, 114, 116 and 118 and the central repository server 140. For exemplary purposes, first command server 108 may be software code located on the server associated with application system 112, second command server 126 may be software code located on the server associated with application system 116, and third command server 128 may be software code located on the server associated with application system 118. However, it is to be understood that in alternative embodiments servers 108, 126 and 128 may be separate processes running on the same machine, may be remotely located on separate machines in other parts of the enterprise communications network 100a, or a combination of both. Further, multiple command servers may be used depending on volume demand and the location of required procurement information.

First command server 108 is configured to broker information requests from central repository 140 and other various applications on the network 100a through a well-known computer technology called object-oriented programming (OOP) which allows a client and server to be located on different (heterogeneous) "platforms". An object is a self-contained module of data and its associated processing and a platform is a combination of the specific hardware/software/operating system/communication protocol which a machine uses to do its work. OOP allows the client application program and server application program to operate on their own platforms without requiring knowledge of how the client application's work requests will be communicated and accepted by the server application. Likewise, the server does not require knowledge of how the OOP system will receive, translate and send the server application's processing results back to the requesting client application. The Object Management Group (OMG), which is an international consortium of organizations involved in various aspects of computing on client/server computing on heterogenous platforms, has set forth published standards by which clients communicate (in OOP form) with servers. As part of these standards, an Object Request Broker (ORB™) has been defined (known as the Common Object Request Broker Architecture, or CORBA® for short) which provides an object-oriented bridge between the client and the server. In the disclosed embodiments, the command servers 108, 126 and 128 and administrator server 110 are object request brokers. CORBA® standards are discussed in CORBA: Architecture and Specification (OMG, 1998), which is hereby incorporated by reference. The interoperability of CORBA® allows an object request broker such as first command server 108 to exchange requests from applications and objects across the communications network 100a.

In the embodiment disclosed herein, first, second and third command servers 108, 126 and 128 and administrator server 130 may be programmed in an object oriented programming language such as Java® from Sun Microsystems Corporation. The Java® programming language is intended for usage in networked/distributed environments such as communications network 100.

First command server 108 will utilize published API protocols for Java® to retrieve and supply requested data from application systems 112 and 114 to central repository 140. An API is a set of functions that may be called to perform an action(s). Second and third command servers 126 and 128 will retrieve and supply requested data from application systems 116 and 118, respectively. Residing in command servers 108, 126 and 128 are first, second and third commands tables 120, 122, and 124, respectively. The commands tables 120, 122, and 124 are configured to initiate object requests from remote applications such as requests from the central repository 140. These commands tables may be programmed using database software from Oracle Corporation for example.

In operation, the procurement agent at the user interface 112*a* creates a job order folder (or requisition folder) in the first application system 112 which will contain a record of the job order. The procurement agent may also periodically during the order process add or delete documents from the job order in the job order folder. The first application system 112 is configured to pass commands and parameters necessary to create and update a corresponding job order folder in central repository 140 to commands table 120. For example, commands entered into the commands table 120 may be instructions to create a folder, as here, and parameters entered into the commands table 120 may include the folder's name and a path to create a folder. The first command server 108 is designed to periodically poll the commands table 120 and to pass the commands and parameters to the central repository 140 to create a central repository order folder which stores the job order information. After receiving a signal from the central repository 140 that an order folder has been created in the central repository 140, the command server 108 will place a status indication in the commands table 120 and check the commands table 120 to determine if there are any other commands to execute. The command server 108 will continue to periodically poll the commands table 120 to determined any changes to the commands table 120.

First command server 108 is connected to the central repository 140 through a central repository API 132. As previously discussed, the disclosed embodiment implements the first command server 108 in the Java® programming language. The central repository API 132 includes a library of Java® methods which is a set of functions that may be called on to access the central repository 140. The central repository API 132 is connected directly to the central repository 140 and through central repository modules 134 and 136 to the central repository. Modules 134 and 136 may be programmed in the language of the central repository database management software and perform a variety of tasks. For example, central repository module 134 includes a graphics module which is designed to convert the drawings of the job record into several different graphical formats. Vendors 104 are then capable of downloading the drawings using a variety of graphic software programs from website 107. Central repository module 136 may perform a wide variety of administrative functions.

As previously discussed, first command server 108 is designed to continually poll commands table 120 for updates in the job order record by application system 112. Also, if the central repository 140 and its accompanying software are disabled, the first command server 108 will notify the commands table 120.

Second application system 114 is designed to update commands table 120 with, for example, vendor information and this information will be sent to central repository 140 in a similar manner as the job order record from first application system 112.

Second commands table 122 will be updated by the third application system 116 which may be an engineering records center application. Third application system 116 will supply engineering drawings, etc. to the job order folder created in central repository 140. Second command server 126 will function in a manner similarly to command server 108 except the number of commands available to second command server 126 may be a subset of those available to the commands server 108. Therefore, the third application system 116 may be designed to only have access to commands that are pertinent to its operation. For example, the third application system 116 may not be capable of adding or deleting predetermined information from the central repository database 140. Second command server 126 is designed to continually poll commands table 122 for updates. Second command server 126 includes the central repository API classes necessary to interface directly with central repository API 132 and pass information to the central repository 140.

Third commands table 124 may be updated by fourth application system 118 which may be a product data management program which will transfer associated product specifications to the job order folder in central depository 140. Third command server 128 also functions in a manner similar to second command server 126, except the range of limited commands available may be different. Third command server 128 continually polls commands table 124 for updates and passes the information to central repository 140.

In the disclosed embodiment, the second and third command servers 126 and 128 are located in proximity to application systems 116 and 118. However, in alternative embodiments, the functions of the command servers 126 and 128 may be incorporated into the functions of the command server 108. An advantage of this design would be to minimize the maintenance of remote servers such as command servers 126 and 128.

Administrator server 110 provides an interface to the status of the command server 108 and command servers 126 and 128. The administrator server 110 is configured to edit and rerun commands and it also supports starting and stopping the command servers 108, 126 and 128. The administrator server 110 executes its commands through an administrator commands table 130 which interacts with commands tables 120, 122 and 124. The administrator server 110 and commands table 130 may reside on the server associated with the first application system 112 or at another location in the system. The administrator server 110 allows the system integration to continue even if the central repository database management software or one of its components is disabled.

Figure 3A:
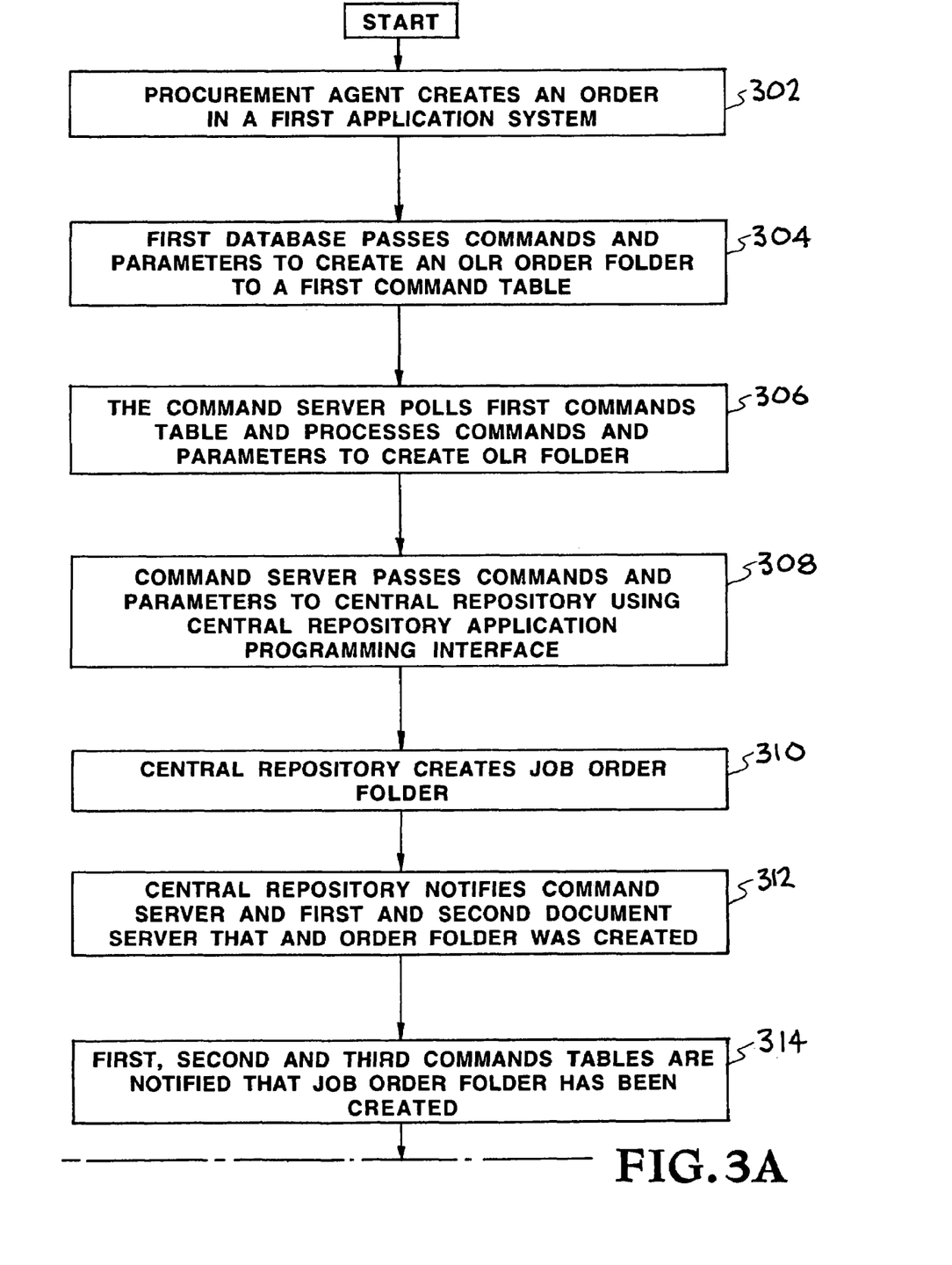
FIGS. 3A–3C are a schematic representation in block diagram form of a method of operation of a procurement system of FIG. 1.
Figure 3B:
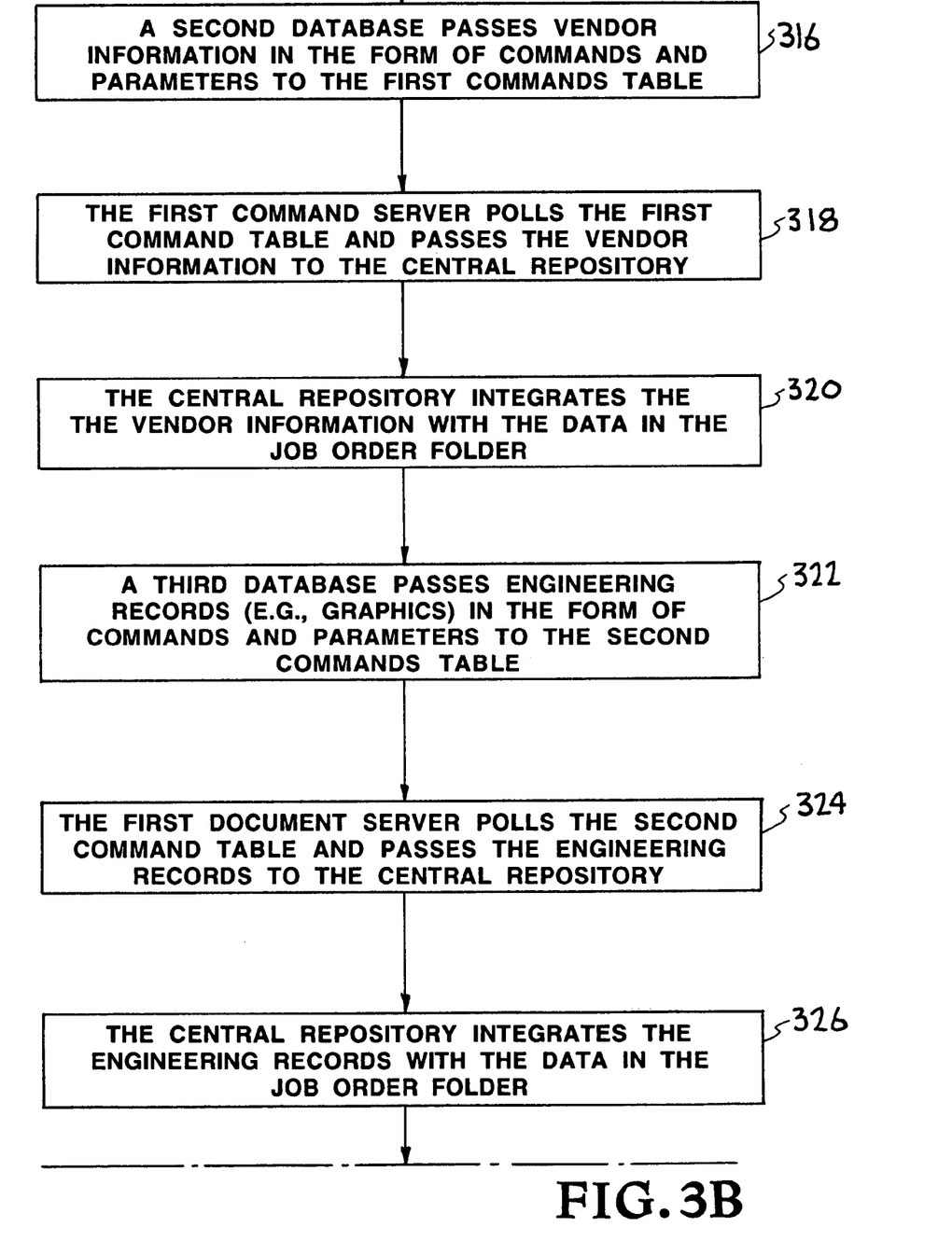
Figure 3C:
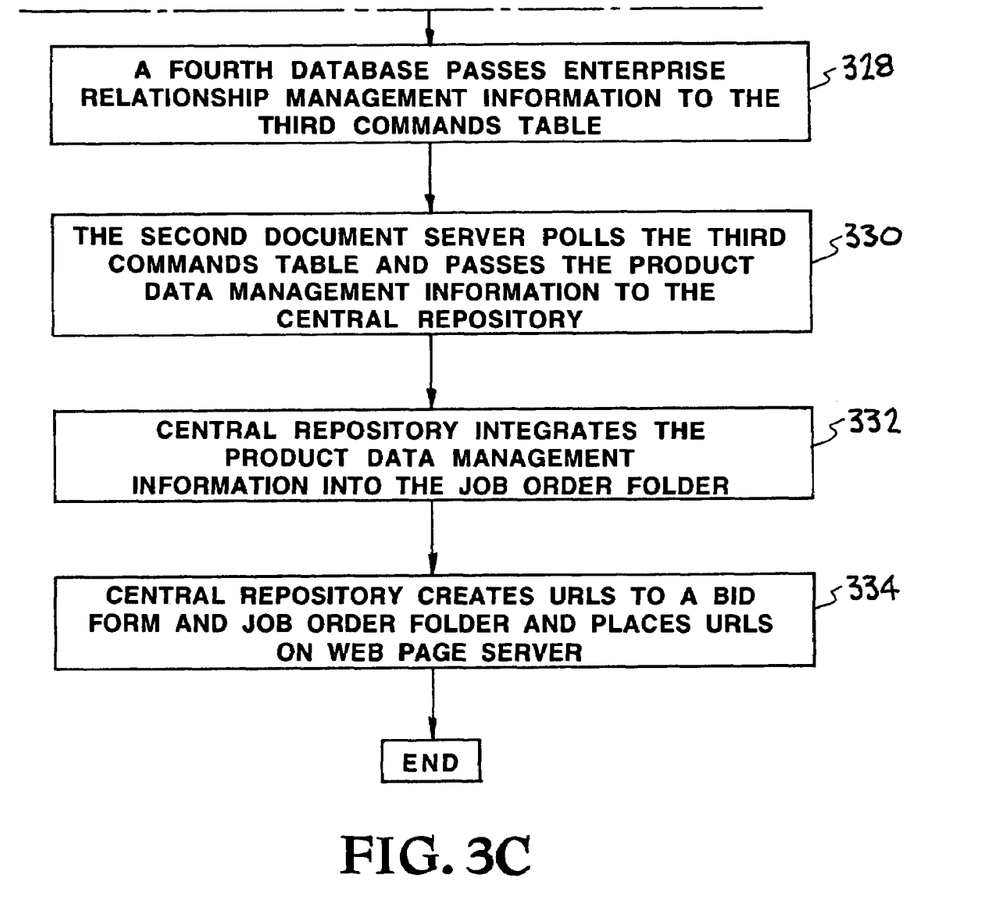

FIG. 3 is a schematic representation in block diagram form of a method of operation of the procurement system of FIG. 1. In step 302, a procurement agent creates job order in the first application system 112. In step 304, first application system 112 passes commands and parameters to create an order folder to a first commands table 120. In step 306, the command server 108 polls the first commands table 120 and processes commands and parameters to create an order folder. In step 308, the order folder creation information is passed to the central repository 140 using the central repository APIs. In step 310, the central repository 140 creates a job order folder. In step 312, central repository 140 notifies the command servers 108, 126 and 128 that an order folder has been successfully created. In step 314, the first, second and third commands tables 120 are notified that the order folder has been successfully created.

In step 316, a second application system passes vendor information in the form of commands and parameters to the first commands table 120. In step 318, the first command server 108 polls the first commands table 120 and passes the vendor information to the central repository 140. In step 320, the central repository 140, integrates the vendor information with the data in the job order folder. In step 322, a third application system passes engineering records in the form of commands and parameters to the second commands table 122. In step 324, the second command server polls the second commands table and passes the engineering records to the central repository 140. In step 326, the central repository 140 integrates the engineering records with the data in the job order folder. In step 328, a fourth application system 118 passes product data management information to the third commands table 124. In step 330, the third command server 128 polls the third commands table 124 and passes the product management information to the central repository 140. In step 332, the central repository 140 integrates the product data management information into the job order folder. In step 334, the central repository 140 creates uniform resource locators (URLs) to a bid form and OLR order folder and places URLs on the webpage server 107.

The invention claimed is:

1. A procurement system that integrates information from multiple source locations consisting of:
    network means for communicating data electronically;
    product data management means for creating specifications coupled to said network means, said product data management means located at one of the multiple source locations;
    knowledge management means for processing data coupled to said network means, said knowledge management means including central repository database means for storing data, said central repository database means located at one of the multiple source locations;
    requisition application means for processing data coupled to said network means, said requisition application means located at one of the multiple source locations;
    a job specification that is created in said product management means;
    vendor information that is created in said central repository database means of said knowledge management means; and
    engineering records that are created in said central repository database means of said knowledge management means.

2. The procurement system that integrates information from multiple source locations of claim 1, wherein said network means is a global network.

3. The procurement system that integrates information from multiple source locations of claim 2, wherein said network means is a local network.

4. The procurement system that integrates information from multiple source locations of claim 2, wherein said network means is a local network comprising a local area network or a token-ring network or an Ethernet network.

5. The procurement system that integrates information from multiple source locations of claim 1, wherein said knowledge management means includes an engineering records center located at one of the multiple source locations.

6. The procurement system that integrates information from multiple source locations of claim 5, wherein said knowledge management means includes a vendor authorization center located at one of the multiple source locations.

7. The procurement system that integrates information from multiple source locations of claim 1, wherein said requisition application means includes an online requisition system located at one of the multiple source locations.

8. The procurement system that integrates information from multiple source locations of claim 1, including a website coupled to said network means and wherein said job specification is posted on said website.

9. The system that integrates information from multiple source locations of claim 1, including a website coupled to said network and wherein said vendor information is posted on said website.

10. The procurement system that integrates information from multiple source locations of claim 1, including a website coupled to said network and wherein said job specification and said vendor information are posted on said website.

11. The procurement system that integrates information from multiple source locations of claim 1, wherein said central repository database means includes an application programming interface API which controls access to said engineering records.

12. The procurement system that integrates information from multiple source locations of claim 1, wherein said requisition application means includes online ordering information.

13. The procurement system that integrates information from multiple source locations of claim 1, wherein said central repository database means includes a central repository database management program.

14. The procurement system that integrates information from multiple source locations of claim 1, wherein said central repository database means includes a central repository database management program that is a collaborative environment software program.

15. The procurement system that integrates information from multiple source locations of claim 14, wherein said central repository database management program is Livelink®.

16. A procurement system that integrates information from multiple source locations consisting of:
    network means for communicating data electronically;
    product data management means for creating specifications coupled to said network means, said product data management means located at one of the multiple source locations;
    knowledge management means for processing data coupled to said network means, said knowledge management means including central repository database means for storing data, said central repository database means located at one of the multiple source locations, said central repository database means including an engineering records center and a vendor authorization center;

requisition application means for processing data coupled to said network means, said requisition application means located at one of the multiple source locations;

a job specification that is created in said product management means;

vendor information that is created in said central repository database means of said knowledge management means;

engineering records that are created in said central repository database means of said knowledge management means; and a website coupled to said network means, wherein said job specification and said vendor information are posted on said website.

17. The procurement system that integrates information from multiple source locations of claim 16, wherein said network means is a global network.

18. The procurement system that integrates information from multiple source locations of claim 16, wherein said network means is a local network comprising a local area network or a token-ring network or an Ethernet network.

19. The procurement system that integrates information from multiple source locations of claim 16, further comprising: a website coupled to said network means and wherein said job specification and said vendor information are posted on said website.

20. The procurement system that integrates information from multiple source locations of claim 16, wherein said central repository database means includes application programming interface API protocols which controls access to said engineering records.

21. The procurement system that integrates information from multiple source locations of claim 16, wherein said requisition application means includes an online requisition system.

22. The procurement system that integrates information from multiple source locations of claim 16, wherein said central repository database means includes a central repository database management program that is a collaborative environment software program.

* * * * *